(12) United States Patent
Seo

(10) Patent No.: US 7,845,675 B2
(45) Date of Patent: Dec. 7, 2010

(54) SIDE AIRBAG DEVICE

(75) Inventor: Bo Pil Seo, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 12/478,972

(22) Filed: Jun. 5, 2009

(65) Prior Publication Data

US 2010/0127483 A1    May 27, 2010

(30) Foreign Application Priority Data

Nov. 27, 2008    (KR) .................. 10-2008-0119167

(51) Int. Cl.
*B60R 21/207* (2006.01)
(52) U.S. Cl. .................................. 280/730.2
(58) Field of Classification Search ................ 280/729, 280/728.2, 730.2
See application file for complete search history.

(56) References Cited

U.S. PATENT DOCUMENTS

| | | | |
|---|---|---|---|
| 3,715,130 A * | 2/1973 | Harada et al. | 280/738 |
| 3,843,150 A * | 10/1974 | Harada et al. | 280/729 |
| 4,076,277 A * | 2/1978 | Kuwakado et al. | 280/738 |
| 5,890,732 A * | 4/1999 | Nakamura et al. | 280/729 |
| 5,967,547 A * | 10/1999 | Narita et al. | 280/730.2 |
| 5,992,878 A * | 11/1999 | Narita et al. | 280/730.2 |
| 6,113,135 A * | 9/2000 | Tsutsumi | 280/730.2 |
| 2003/0168836 A1* | 9/2003 | Sato et al. | 280/730.2 |

* cited by examiner

*Primary Examiner*—Paul N Dickson
*Assistant Examiner*—Robert A Coker
(74) *Attorney, Agent, or Firm*—Morgan, Lewis & Bockius LLP

(57) ABSTRACT

The present invention provides a side airbag device which can be rapidly and reliably deployed even in the small space between a door trim and a passenger. The side airbag device includes an inflator, an airbag including an upper cushion to be deployed by a gas pressure supplied from the inflator, an upper guide connected at a first end thereof to the upper cushion of the airbag to lead deployment of the airbag, and a medial unit coupled to a second end of the upper guide to provide an actuating force to the upper guide using the gas pressure from the inflator.

12 Claims, 6 Drawing Sheets

SIDE AIRBAG DEVICE

CROSS-REFERENCE TO RELATED APPLICATIONS

The present application claims priority to Korean Patent Application Number 10-2008-0119167 filed Nov. 27, 2008, the entire contents of which application is incorporated herein for all purpose by this reference.

BACKGROUND OF THE INVENTION

1. Field of the Invention

The present invention relates to a side airbag device having superior deployment performance.

2. Description of Related Art

Recently, the number of vehicles having side airbags has increased. Generally, such a side airbag is installed in a side portion of a seat back which is adjacent to the door. When a vehicle is involved in a side collision, the airbag is deployed into a space between the door and a passenger to protect the passenger from physical force applied to the vehicle from the lateral direction.

However, the space between the door and the passenger is relatively small, and protrusions, such as an armrest, etc., are present on the door trim. Thus, because of interference from the door trim, the side airbag may be incorrectly or incompletely deployed. To prevent such defective deployment of the airbag, a relatively large space must be ensured between the door and the passenger. However, this limits the degree of freedom when designing the door trim.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a side airbag device which can be rapidly and reliably deployed even in the small space between a door trim and a passenger without defective deployment.

In an aspect of the present invention, the side airbag device may include an inflator; an airbag including an upper cushion to be deployed by a gas pressure supplied from the inflator; an upper guide connected at a first end thereof to the upper cushion of the airbag to lead deployment of the airbag; and a medial unit coupled to a second end of the upper guide to provide an actuating force to the upper guide using the gas pressure from the inflator, wherein the airbag is configured to pivotally unfold into a sectorial shape with respect to the medial unit, a first portion of the upper cushion moving relatively away from a second portion thereof around the medial unit.

The upper guide may radially extend from the second end thereof to the first end thereof and leads the pivotal deployment of the airbag, the first end of the upper guide rotating around the second end thereof using the actuating force provided from the medial unit.

The medial unit may include a slider moving linearly using the gas pressure; and a gear assembly coupled with the upper guide and engaged with the slider to convert a linear motion of the slider into a rotational motion of the gear assembly and transmit the rotational motion to the second end of the upper guide, wherein the slider is slidably disposed in a cylinder portion of the inflator and receives the gas pressure of the inflator and a rack gear portion is formed to a side of the cylinder portion, and wherein the gear assembly includes a first pinion engaged with the rack gear portion of the gear assembly, wherein the cylinder portion is formed in one end of the inflator, the cylinder portion having a diameter less than a diameter of the inflator and wherein the slider closes a gas passage from the inflator to the upper cushion in a normal state but open the gas passage in a linear motion in deploying state.

The airbag further may includes a lower cushion to deploy in opposite direction of the upper cushion and may further include a lower guide connected at a first end thereof to the lower cushion of the airbag to lead pivotal deployment thereof in the opposite direction of the upper cushion, wherein when the airbag is completely deployed, the upper and lower cushions are configured to come into contact with each other.

In another aspect of the present invention, the medial unit may include a slider moving linearly using the gas pressure; and a gear assembly coupled with the upper and lower guides and engaged with the slider to convert a linear motion of the slider into a rotational motion of the gear assembly and transmit the rotational motion to the second ends of the first and second guides, wherein the first and second guides rotate in opposite direction each other, wherein the slider closes gas passage from the inflator to the upper and lower cushions in a normal state but open the gas passage in the linear motion in deploying state, wherein the slider is slidably disposed in a cylinder portion of the inflator and receiving the gas pressure of the inflator and a rack gear portion is formed to a side of the cylinder portion, and wherein the gear assembly includes a first pinion coupled to the upper guide and engaged with the rack gear portion of the gear assembly and a second pinion coupled to the lower guide and engaged with the first pinion.

In further another aspect of the present invention, a line connecting rotation axes of the first and second pinions may be away from a movement direction of the slider with a predetermined angle with the rotation axis of the first pinion so as to prevent an interference of the second pinion with the slider.

In still further another aspect of the present invention, the slider is slidably disposed in a cylinder portion of the inflator and receiving the gas pressure of the inflator and a rack gear portion is formed to a side of the cylinder portion, and wherein the gear assembly includes a first pinion coupled to the upper guide and engaged with the rack gear portion of the gear assembly and a second pinion coaxially fixed to the first pinion, and a third pinion coupled to the lower guide and engaged with the second pinion.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIGS. 3 and 4 are views showing a deployment process of the exemplary side airbag device of FIG. 2, in which FIG. 3 is a view illustrating an airbag which is being deployed, and FIG. 4 is a view illustrating the airbag that is in a state of being completely deployed.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
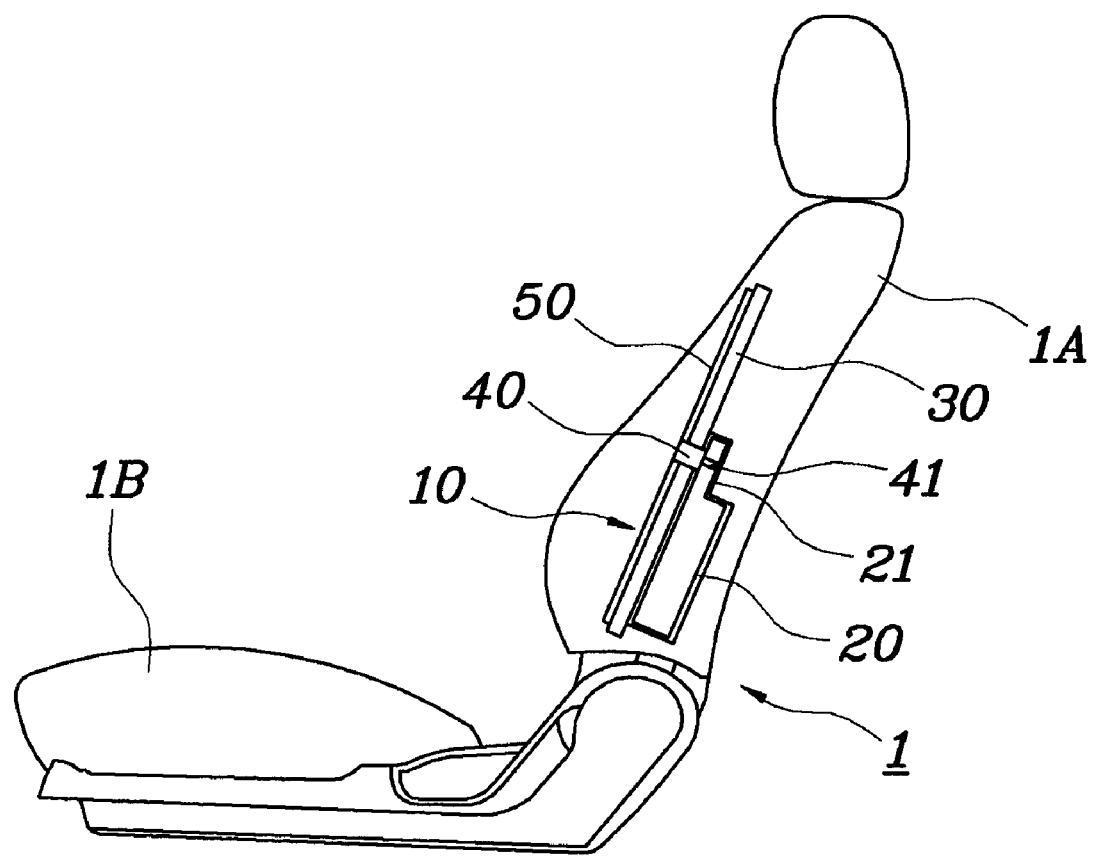
FIG. 1 is a view showing a seat provided with an exemplary side airbag device, according to the present invention.

FIG. 1 illustrates a vehicle seat 1 having a seat back 1A and a seat cushion 1B. Referring to FIG. 1, the side airbag device 10 according to various embodiments of the present invention is installed in a side portion of the seat back 1A. The side airbag device 10 is constructed such that when an airbag 30 is deployed forwards by gas pressure generated from an inflator 20, a guide 50 leads deployment of the airbag 30. A medial unit 40 is connected to a second end of the guide 50 to provide actuating force to the guide 50.

Figure 2:
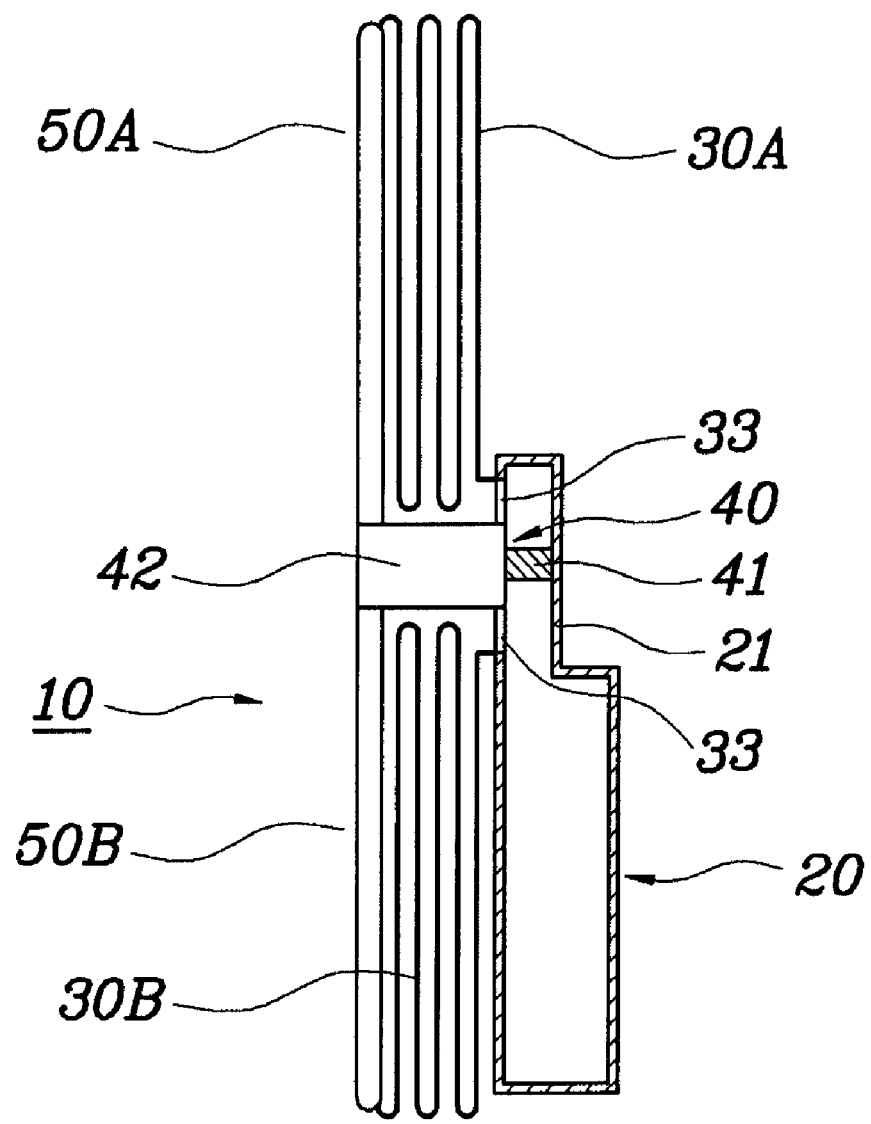
FIG. 2 is a side view of the exemplary side airbag device according to the present invention.

Referring to FIGS. 1 and 2, the inflator 20 is installed in the seat back 1A and oriented upwards. A cylinder portion 21 which has a slider 41 of the medial unit 40 therein is provided in a front end, that is, an upper end, of the inflator 20 through which gas is supplied into the airbag 30. The cylinder portion 21 has a diameter less than that of portions of the inflator 20 other than the front end. The cylinder portion 21 functions to increase gas pressure supplied from the lower end of the inflator 20. When the airbag 30 is deployed, the slider 41 is strongly propelled upwards in the cylinder portion 21 by the increasing gas pressure inside the cylinder portion 21. Meanwhile, gas holes 33 through which gas is supplied into the airbag 30 are formed in the cylinder portion 21.

Figure 3:
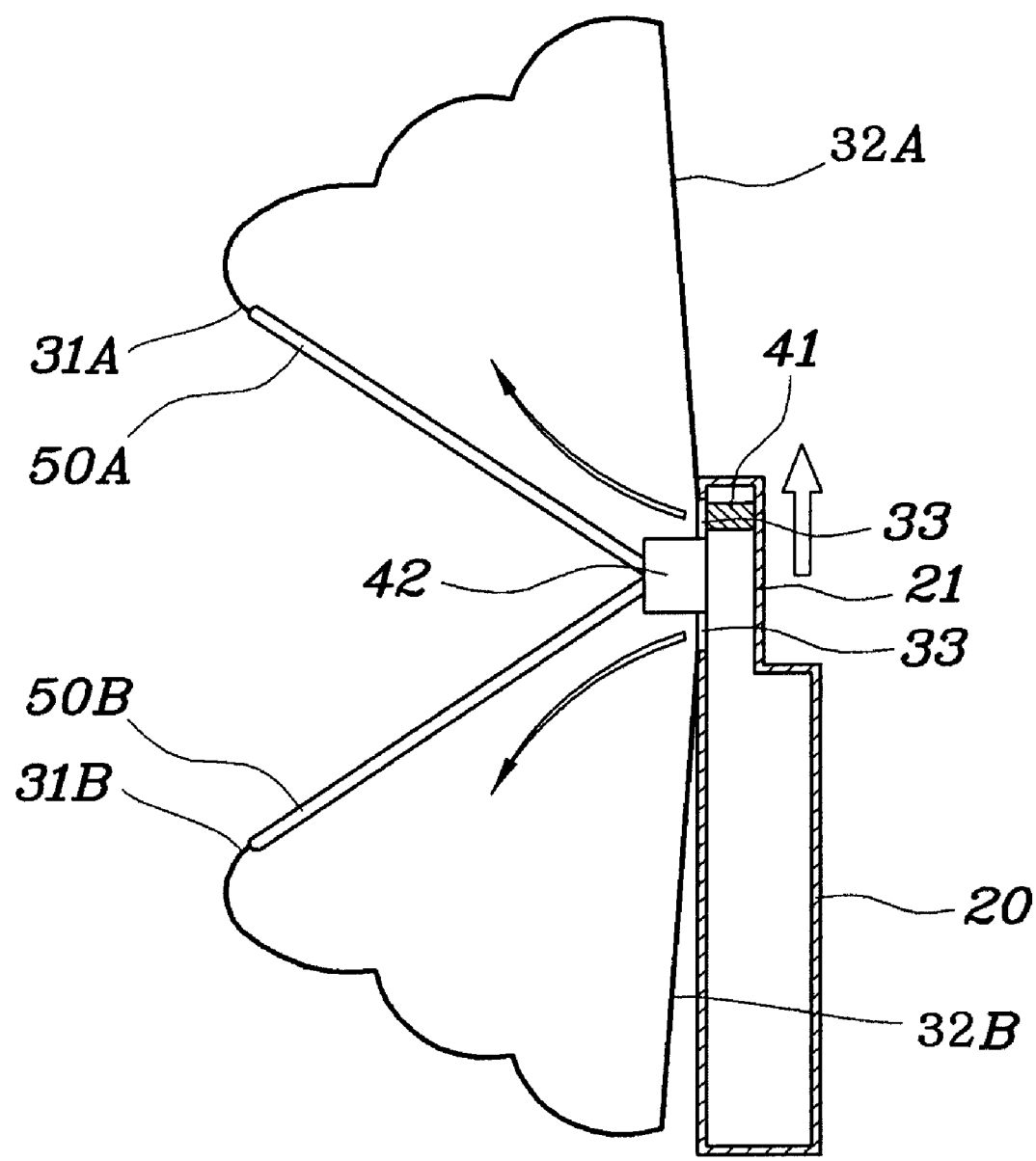
Figure 4:
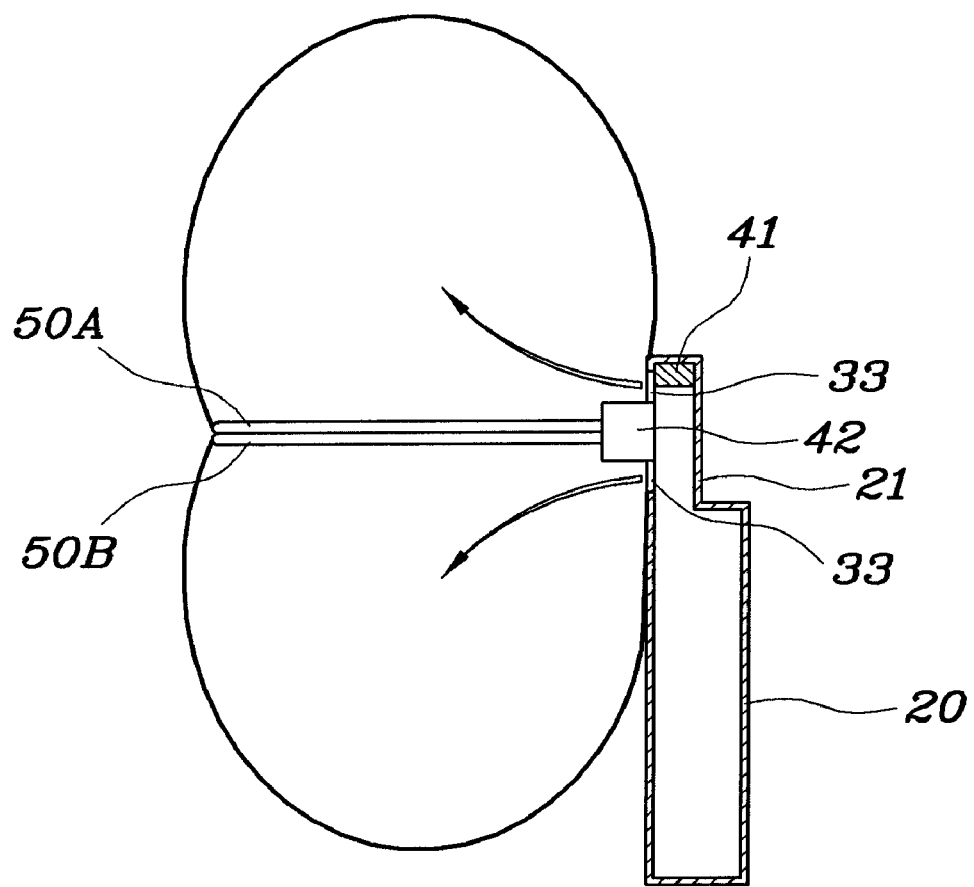

Referring to FIGS. 2 through 4, the airbag 30 is constructed such that from a state of having been folded in the side portion of the seat back, the airbag 30 unfolds into a sectorial shape in such a way that a first portion of the airbag 30 is moved away from a second portion thereof around the medial unit 40. The airbag 30 may be deployed in such a way that the first portion thereof is rotated from the second portion thereof by 180°. However, in consideration of a more rapid and reliable deployment of the airbag 30, as shown in FIG. 4, the airbag 30 preferably comprises upper and lower cushions 30A and 30B, each of which is deployed at 90°. The upper cushion 30A is deployed in such a way that a first portion 31A thereof unfolds downwards (in a counterclockwise direction in FIG. 4) from a second portion 32A thereof. The lower cushion 30B is deployed in such a way that a first portion 31B thereof is unfolded upwards (in a clockwise direction in FIG. 4) from a second portion 32B thereof. The upper and lower cushions 30A and 30B communicate with each other. Chambers which are partitioned by diaphragms may be formed in each cushion 30A, 30B.

The guide 50 is connected at a first end thereof to the airbag 30 and connected at the second end thereof to the medial unit 40. The guide 50 radially extends from the second end thereof to the first end thereof and leads deployment of the airbag 30 in such a way that the first end of the guide 50 is rotated around the second end thereof by actuating force transmitted from the medial unit 40. The guide 50 which conducts a function similar to that of the ribs of an umbrella or fan ensures a rapid and reliable deployment of the airbag 30 and withstands physical force transmitted from the vehicle door in the lateral direction. As shown in FIG. 4, when the airbag 30 is completely deployed, the upper and lower cushions 30A and 30B come into contact with each other. The guide 50 is provided on contact surfaces between the upper and lower cushions 30A and 30B, that is, on the first portions 31A and 31B thereof. The guide 50 is made, for example, of reinforced plastic.

Figure 5:
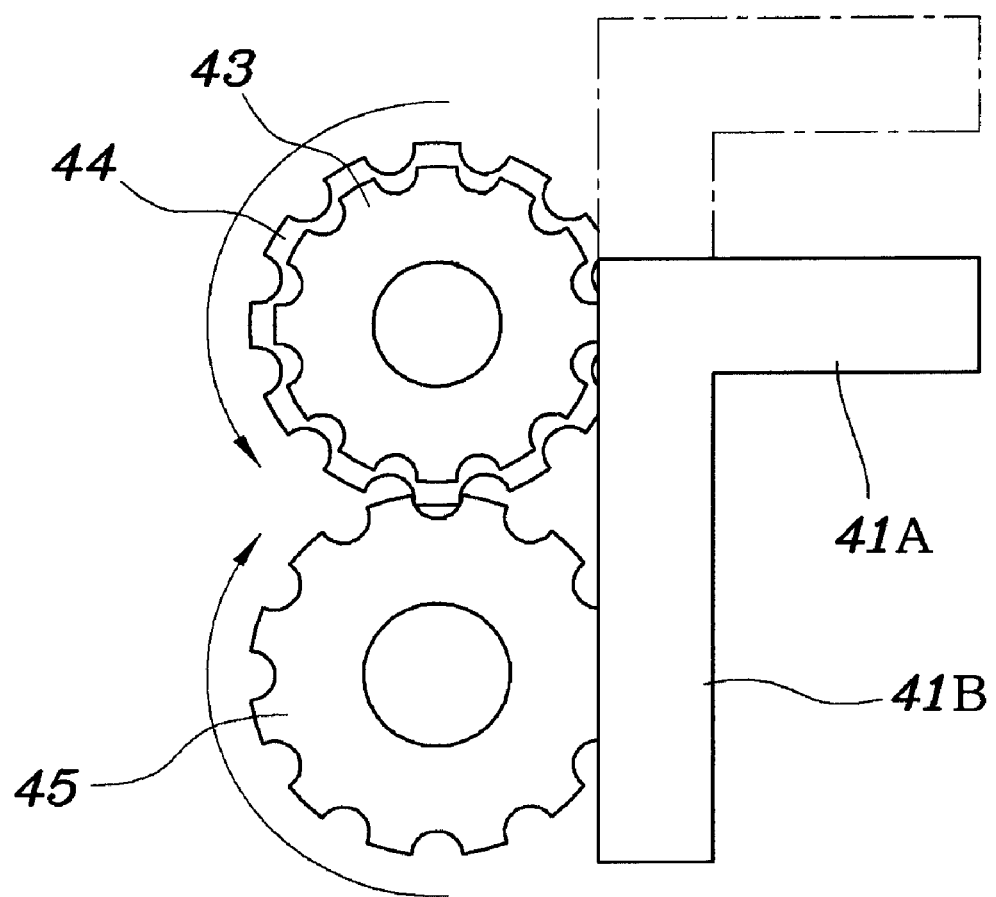
FIG. 5 is a schematic side view of a medial unit shown in FIG. 3.
Figure 6:
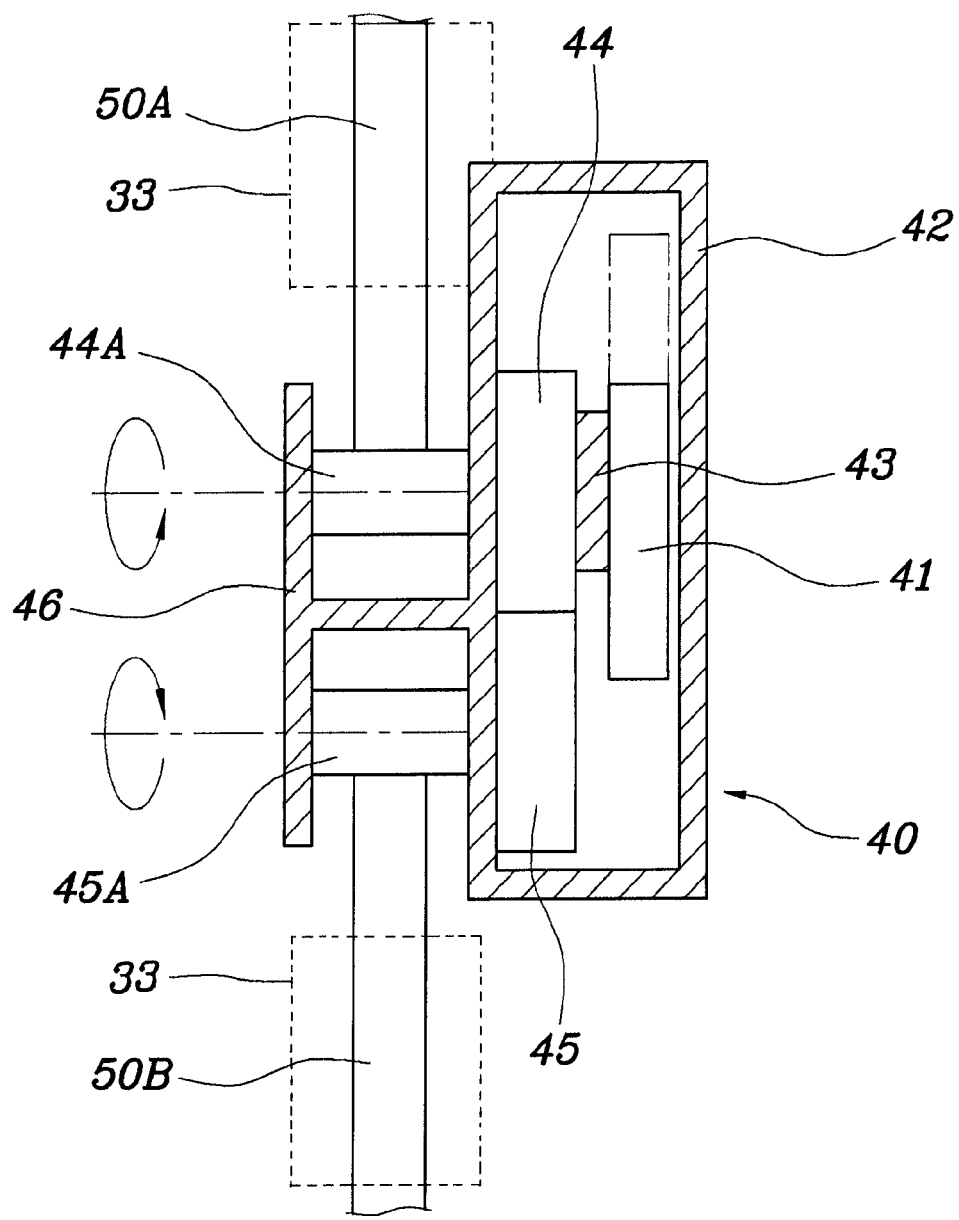
FIG. 6 is a schematic front view of the medial unit of FIG. 5.

Referring to FIGS. 5 and 6, the medial unit 40 includes the slider 41 which linearly moves in the longitudinal direction of the inflator 20 because of gas pressure of the deploying airbag 30. The medial unit 40 further includes a gear assembly 43, 44 and 45 which is coupled to the second end of the guide 50.

As shown in FIG. 5, the slider 41 includes a piston part 41A which is disposed in the inflator 20, and a rack gear part 41B which engages with the gear assembly 43, 44 and 45. When the slider 41 moves upwards under gas pressure, a first pinion 43 of the gear assembly which engages with the rack gear part 41B rotates in a counterclockwise direction. Then, a second pinion 44 which is coaxially coupled to the first pinion 43 also rotates in a counterclockwise direction. A third pinion 45 which engages with the second pinion 44 rotates in a clockwise direction.

As shown in FIG. 6, the guide 50 includes an upper guide 50A which leads deployment of the upper cushion 30A, and a lower guide 50B which leads deployment of the lower cushion 30B. A second end of the upper guide 50A is connected to a rotating shaft 44A of the second pinion 44. A second end of the lower guide 50B is connected to a rotating shaft 45A of the third pinion 45. Thus, when the second pinion 44 rotates in a counterclockwise direction, the upper guide 50A also rotates in a counterclockwise direction. When the third pinion 45 rotates in a clockwise direction, the lower guide 50B also rotates in a clockwise direction. As a result, as shown in FIG. 4, when the airbag 30 is deployed by pressure of gas supplied thereinto through the gas holes 33, the upper and lower guides 50A and 50B each rotate at 90°, thus leading to the deployment of the airbag 30.

Meanwhile, in FIG. 6, the reference numeral 42 denotes a casing which contains the gear assembly therein, and 46 denotes a support member which extends from the casing 42 to support the rotating shafts 44A and 45A.

As described above, the present invention provides a side airbag device in which an airbag can be rapidly and reliably deployed thanks to leading of a guide without causing defective deployment of the airbag.

However, the present invention is not limited to the side airbag comprising the upper and lower cushions. In an exemplary embodiment of the present invention, the airbag cushion may only include the upper cushion. For this embodiment, the second or third pinions may be removed. Furthermore, even in the side airbag comprising the upper and lower cushions, the second pinion may be removed and the first and third pinions may be engaged. In this case, the diameter of first pinion may be the same as that of the third pinion. However, in this case, to prevent an interference of the slider and the third pinion, third pinions may be away from the movement direction of the slider with a predetermined angle with respect to a rotational axis of the first pinion.

For convenience in explanation and accurate definition in the appended claims, the terms "upper", "lower", "upwards", and "downwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A side airbag device, comprising:
   an inflator;
   an airbag including an upper cushion to be deployed by a gas pressure supplied from the inflator;
   an upper guide connected at a first end thereof to the upper cushion of the airbag to lead deployment of the airbag; and
   a medial unit coupled to a second end of the upper guide to provide an actuating force to the upper guide using the gas pressure from the inflator;
   wherein the airbag is configured to pivotally unfold into a sectorial shape with respect to the medial unit, a first portion of the upper cushion moving relatively away from a second portion thereof around the medial unit;
   wherein the upper guide radially extends from the second end thereof to the first end thereof and leads the pivotal deployment of the airbag, the first end of the upper guide rotating around the second end thereof using the actuating force provided from the medial unit; and
   wherein the medial unit comprises:
      a slider moving linearly using the gas pressure; and
      a gear assembly coupled with the upper guide and engaged with the slider to convert a linear motion of the slider into a rotational motion of the gear assembly and transmit the rotational motion to the second end of the upper guide.

2. The side airbag device as set forth in claim 1, wherein the slider is slidably disposed in a cylinder portion of the inflator and receives the gas pressure of the inflator and a rack gear portion is formed to a side of the cylinder portion, and wherein the gear assembly includes a first pinion engaged with the rack gear portion of the gear assembly.

3. The side airbag device as set forth in claim 2, wherein the cylinder portion is formed in one end of the inflator, the cylinder portion having a diameter less than a diameter of the inflator.

4. The side airbag device as set forth in claim 2, wherein the slider closes a gas passage from the inflator to the upper cushion in a normal state but open the gas passage in a linear motion in deploying state.

5. The side airbag device as set forth in claim 1, wherein the airbag further includes a lower cushion to deploy in opposite direction of the upper cushion.

6. The side airbag device as set forth in claim 5, further including a lower guide connected at a first end thereof to the lower cushion of the airbag to lead pivotal deployment thereof in the opposite direction of the upper cushion.

7. The side airbag device as set forth in claim 6, wherein when the airbag is completely deployed, the upper and lower cushions are configured to come into contact with each other.

8. The side airbag device as set forth in claim 5, wherein the medial unit comprises:
   a slider moving linearly using the gas pressure; and
   a gear assembly coupled with the upper and lower guides and engaged with the slider to convert a linear motion of the slider into a rotational motion of the gear assembly and transmit the rotational motion to the second ends of the first and second guides, wherein the first and second guides rotate in opposite direction each other.

9. The side airbag device as set forth in claim 8, wherein the slider closes gas passage from the inflator to the upper and lower cushions in a normal state but open the gas passage in the linear motion in deploying state.

10. The side airbag device as set forth in claim 8, wherein the slider is slidably disposed in a cylinder portion of the inflator and receiving the gas pressure of the inflator and a rack gear portion is formed to a side of the cylinder portion, and wherein the gear assembly includes a first pinion coupled to the upper guide and engaged with the rack gear portion of the gear assembly and a second pinion coupled to the lower guide and engaged with the first pinion.

11. The side airbag device as set forth in claim 10, wherein a line connecting rotation axes of the first and second pinions are away from a movement direction of the slider with a predetermined angle with the rotation axis of the first pinion so as to prevent an interference of the second pinion with the slider.

12. The side airbag device as set forth in claim 8, wherein the slider is slidably disposed in a cylinder portion of the inflator and receiving the gas pressure of the inflator and a rack gear portion is formed to a side of the cylinder portion, and wherein the gear assembly includes a first pinion coupled to the upper guide and engaged with the rack gear portion of the gear assembly and a second pinion coaxially fixed to the first pinion, and a third pinion coupled to the lower guide and engaged with the second pinion.

* * * * *